United States Patent
Akalin et al.

(10) Patent No.: US 8,727,141 B2
(45) Date of Patent: May 20, 2014

(54) MAGNETIC TOOTHBRUSH AND HOLDER

(75) Inventors: Burak Akalin, Gzebe Kocaeli (TR); Feza Ozenc, Istanbul (TR)

(73) Assignee: Colgate-Palmolive Company, New York, NY (US)

( * ) Notice: Subject to any disclaimer, the term of this patent is extended or adjusted under 35 U.S.C. 154(b) by 1312 days.

(21) Appl. No.: 12/526,359

(22) PCT Filed: Feb. 7, 2008
(Under 37 CFR 1.47)

(86) PCT No.: PCT/US2008/053280
§ 371 (c)(1),
(2), (4) Date: Jul. 25, 2011

(87) PCT Pub. No.: WO2008/098107
PCT Pub. Date: Aug. 14, 2008

(65) Prior Publication Data
US 2012/0090117 A1   Apr. 19, 2012

Related U.S. Application Data

(60) Provisional application No. 60/888,697, filed on Feb. 7, 2007.

(51) Int. Cl.
| | |
|---|---|
| *A47F 7/00* | (2006.01) |
| *A47F 5/00* | (2006.01) |
| *A47F 5/08* | (2006.01) |
| *A47K 1/09* | (2006.01) |
| *A47L 13/512* | (2006.01) |
| *B25H 3/04* | (2006.01) |
| *A46B 17/02* | (2006.01) |
| *A47G 1/17* | (2006.01) |
| *F16B 1/00* | (2006.01) |

(52) U.S. Cl.
CPC ............... *A47K 1/09* (2013.01); *A47L 13/512* (2013.01); *B25H 3/04* (2013.01); *A47K 2201/02* (2013.01); *A46B 17/02* (2013.01); *A47G 1/17* (2013.01); *F16B 2001/0035* (2013.01); *Y10S 211/01* (2013.01)
USPC ................ 211/66; 211/DIG. 1; 211/89.01

(58) Field of Classification Search
USPC ............ 211/66, 65, DIG. 1, 87.01, 86.01, 211/119.009, 124, 89.01; 248/121, 206.5, 248/110; 206/362.2; 15/167.1, 105; D4/104, 108, 113; D6/528, 534
See application file for complete search history.

(56) References Cited

U.S. PATENT DOCUMENTS 1,291,349 A  *  1/1919  Ackers ........................... 211/65
2,414,653 A  *  1/1947  Lookholder ................. 335/285
(Continued)

FOREIGN PATENT DOCUMENTS

DE    7639751 U1    3/1977

OTHER PUBLICATIONS

JP 2004 236808 A (Chin Huh) Aug. 26, 2004 Abstract.

*Primary Examiner* — Jennifer E Novosad
(74) *Attorney, Agent, or Firm* — Ryan M. Flandro

(57) ABSTRACT

A toothbrush and holder assembly includes a toothbrush having a handle, a head connected to the handle, cleaning elements extending outwardly from the head and a first magnetic element secured to a portion of the handle. A holder has a bottom surface, at least one recess formed in the bottom surface, and at least one second magnetic element seated in the at least one recess. Each recess is configured to receive the portion of the handle having the first magnetic element secured thereto.

11 Claims, 6 Drawing Sheets

(56) References Cited

U.S. PATENT DOCUMENTS

| | | | |
|---|---|---|---|
| 2,642,999 A * | 6/1953 | McPherson | 211/65 |
| D171,468 S * | 2/1954 | Simon | D6/528 |
| 2,725,147 A * | 11/1955 | Vogler | 211/65 |
| 2,798,241 A * | 7/1957 | Cohen | 15/143.1 |
| 3,109,619 A * | 11/1963 | Krug et al. | 248/690 |
| 3,228,737 A * | 1/1966 | Kipnis | 312/206 |
| 3,450,269 A * | 6/1969 | Samuel | 211/65 |
| 3,782,799 A * | 1/1974 | Hansen | 312/206 |
| 3,853,365 A * | 12/1974 | Nielsen | 312/206 |
| D253,151 S * | 10/1979 | Heckler | D6/534 |
| 4,325,485 A * | 4/1982 | Pina et al. | 211/66 |
| 4,523,599 A * | 6/1985 | Collet | 132/313 |
| 4,589,159 A * | 5/1986 | Streibel | 15/167.1 |
| D294,442 S * | 3/1988 | Bordian | D6/528 |
| 5,163,566 A * | 11/1992 | Hempel | 211/65 |
| 5,301,822 A * | 4/1994 | Coleman et al. | 211/70.6 |
| 5,335,798 A * | 8/1994 | Bonwell et al. | 211/65 |
| 5,417,397 A * | 5/1995 | Harnett | 248/309.4 |
| 5,566,842 A * | 10/1996 | Dennis | 211/87.01 |
| 6,622,978 B1 * | 9/2003 | Ghiz | 248/110 |
| 6,763,734 B2 * | 7/2004 | Shukla et al. | 73/864.01 |
| 6,877,619 B1 * | 4/2005 | Han | 211/65 |
| 7,255,313 B2 * | 8/2007 | Lane | 248/222.41 |
| D568,610 S * | 5/2008 | McQueen | D4/108 |
| D607,252 S * | 1/2010 | Meyer | D6/534 |
| 8,132,681 B2 * | 3/2012 | Afghan et al. | 211/66 |
| 2003/0070998 A1 * | 4/2003 | Bulka | 211/66 |
| 2003/0089673 A1 * | 5/2003 | Herren | 211/66 |
| 2008/0061017 A1 * | 3/2008 | Wagner | 211/66 |
| 2009/0184015 A1 * | 7/2009 | Ruppert | 206/362.2 |
| 2012/0112018 A1 * | 5/2012 | Barry et al. | 248/121 |
| 2013/0015201 A1 * | 1/2013 | Lohmann | 222/78 |
| 2013/0125327 A1 * | 5/2013 | Schmid et al. | 15/105 |

* cited by examiner

MAGNETIC TOOTHBRUSH AND HOLDER

CROSS-REFERENCE TO RELATED PATENT APPLICATIONS

The present application is a U.S. national stage application under 35 U.S.C. §371 of PCT Application No. PCT/US2008/053280, filed Feb. 7, 2008, which claims the benefit of priority under 35 U.S.C. 119(e) of U.S. Provisional Patent Application Ser. No. 60/888,697, filed on Feb. 7, 2007, the contents of which arc hereby incorporated by reference in their entireties.

FIELD OF THE INVENTION

This invention relates generally to a toothbrush and holder and, in particular, to a toothbrush magnetically secured to a toothbrush holder.

BACKGROUND

Toothbrush holders are known for holding one or more toothbrushes. Such toothbrush holders often have holes or apertures through which the handles of the toothbrushes extend, thereby supporting the toothbrushes. Other known toothbrush holders have a recess in which multiple toothbrushes are supported, and which may come in contact with one another. Such toothbrush holders often present hygiene problems due to the toothbrushes contacting one another or the holder.

It would be desirable to provide a toothbrush and holder that reduces or overcomes some or all of the difficulties inherent in prior known devices. Particular objects and advantages will be apparent to those skilled in the art, that is, those who are knowledgeable or experienced in this field of technology, in view of the following disclosure of the invention and detailed description of certain embodiments.

SUMMARY

Certain embodiments of a magnetic toothbrush and holder assembly can provide improved ease of use. In accordance with a first aspect, a toothbrush and holder assembly includes a toothbrush having a handle, a head connected to the handle, cleaning elements extending outwardly from the head, and a first magnetic element secured to a portion of the handle. A holder has a bottom surface, at least one recess formed in the bottom surface, and at least one second magnetic element seated in the at least one recess. Each recess is configured to receive the portion of the handle having the first magnetic element secured thereto.

In accordance with another aspect, a toothbrush and holder assembly includes a toothbrush having a handle, a head connected to the handle, cleaning elements extending outwardly from the head, and a first magnetic element secured at a proximal end of the handle. A holder has a bottom surface, a plurality of recesses formed in the bottom surface, and a plurality of second magnetic elements. Each second magnetic element is seated one of the recesses, with each recess being configured to receive the proximal end of the handle.

Features and advantages disclosed here will be further understood from the following detailed disclosure of certain embodiments.

Figure 1:
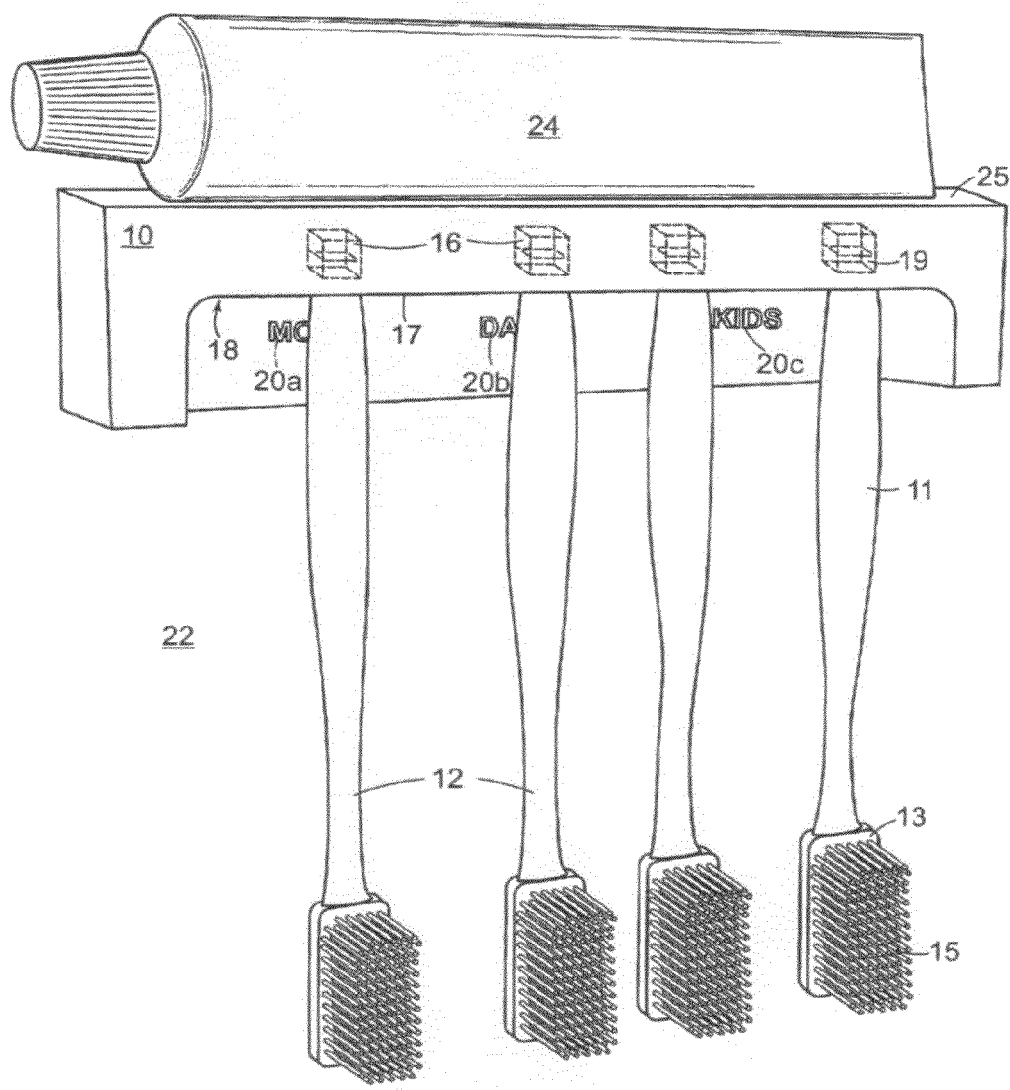
FIG. 1 is a perspective view of a toothbrush and holder.

The figures referred to above are not drawn necessarily to scale and should be understood to provide a representation of a toothbrush and holder assembly, illustrative of the principles involved. Some features of the toothbrush and holder depicted in the drawings have been enlarged or distorted relative to others to facilitate explanation and understanding. The same reference numbers are used in the drawings for similar or identical components and features shown in various alternative embodiments. A toothbrush and holder as disclosed herein would have configurations and components determined, in part, by the intended application and environment in which they are used.

DETAILED DESCRIPTION OF CERTAIN PREFERRED EMBODIMENTS

A toothbrush and holder assembly may be embodied in various forms. An embodiment of a toothbrush holder 10 supporting a plurality of toothbrushes 12 is shown in FIG. 1. Toothbrushes 12 are suspended in inverted fashion from holder 10. Each toothbrush 12 includes a handle 11 and a head 13 connected to handle 11. It is to be appreciated that in certain embodiments, head 13 may be permanently connected to handle 11, e.g., head 13 and handle 11 may be of unitary, that is, one-piece construction. In other embodiments, head 13 may be removably connected to handle 11, providing the capability of replacing head 13 when it is worn. Tooth cleaning elements or cleaning elements 15 are positioned on and extend outwardly from head 13. As used herein, the terms "tooth cleaning elements" and "cleaning elements" include any type of structure that is commonly used or is suitable for use in providing oral health benefits (e.g., tooth cleaning, tooth polishing, tooth whitening, massaging, stimulating, etc.) by making contact with portions of the teeth and gums. Such tooth cleaning elements include, but are not limited to, tufts of bristles that can be formed to have a number of different shapes and sizes, and elastomeric cleaning members that can be formed to have a number of different shapes and sizes, or a combination of both tufts of bristles and elastomeric cleaning members.

Each toothbrush 12 has a first magnetic element 14 (seen in FIG. 4), which is magnetically attracted to a second magnetic element 16, which is positioned in a recess 19 formed in holder 10. In certain embodiments, first and second magnetic elements 14, 16 each may be a magnet, e.g., a permanent magnet or an electromagnet. In other embodiments, one of first and second magnetic elements 14, 16 may be a magnet while the other is a material that is attracted to a magnet, such as a metal, for example. Suitable materials for first and second magnetic elements 14, 16 will become readily apparent to those skilled in the art, given the benefit of this disclosure.

Figure 4:
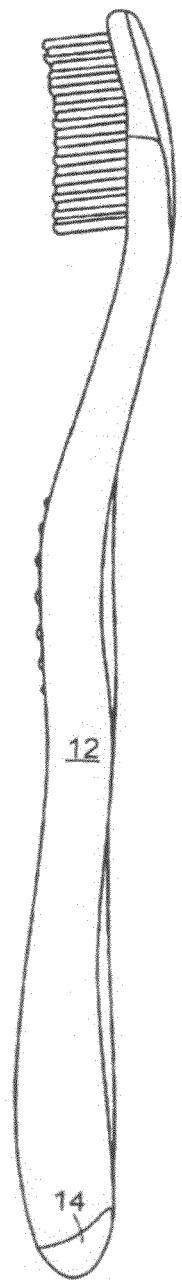
FIG. 4 is a perspective side view of the toothbrush of FIG. 1.
Figure 5:
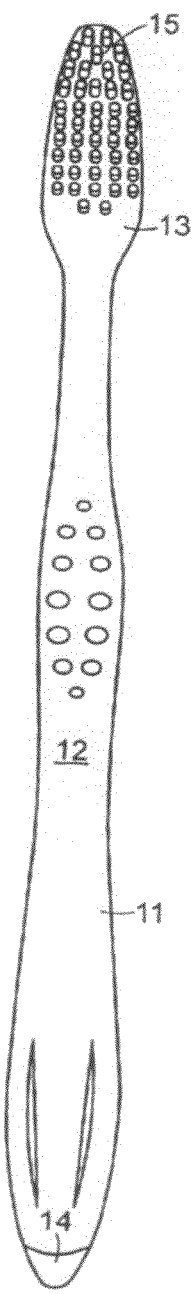
FIG. 5 is a perspective front view of the toothbrush of FIG. 4.
Figure 6:
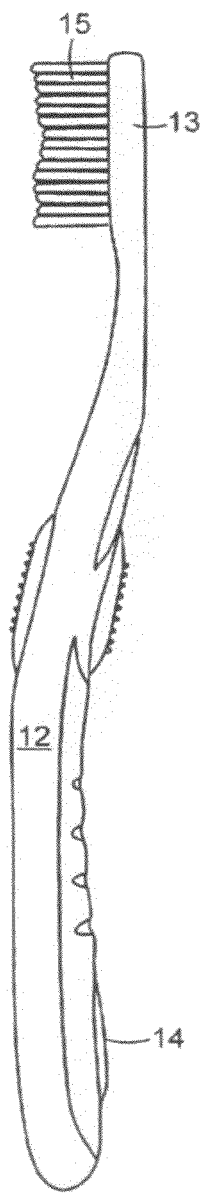
FIG. 6 is a perspective side view of an alternative embodiment of the toothbrush of FIG. 1.
Figure 7:
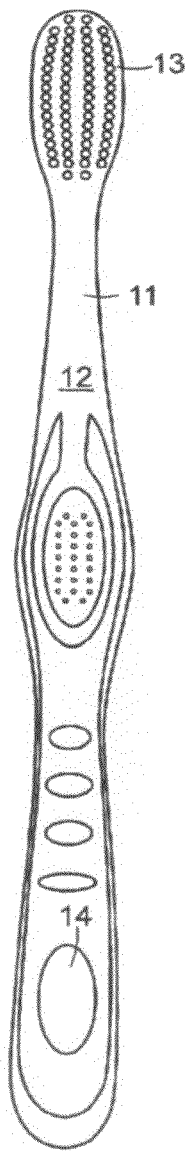
FIG. 7 is a perspective front view of the toothbrush of FIG. 6.

In certain embodiments, as seen in FIGS. 4-5, first magnetic elements 14 are positioned at the proximal end of handle 11 of toothbrush 12, that is, the end of handle 11 opposite head 15. It is to be appreciated that first magnetic elements 14 can be positioned at any location within or along toothbrush 12. As seen in another embodiment illustrated in FIGS. 6-7, first magnetic elements 14 are positioned slightly inwardly from the proximal end of handle 11 of toothbrush 12. First magnetic elements 14 in this embodiment may also include a logo or other decorative element.

Figure 8:
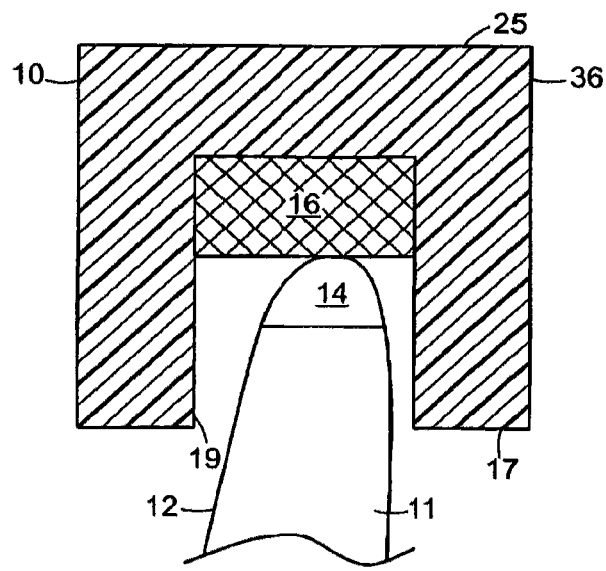
FIG. 8 is a section view showing the toothbrush of FIG. 1 magnetically secured to the holder.
Figure 9:
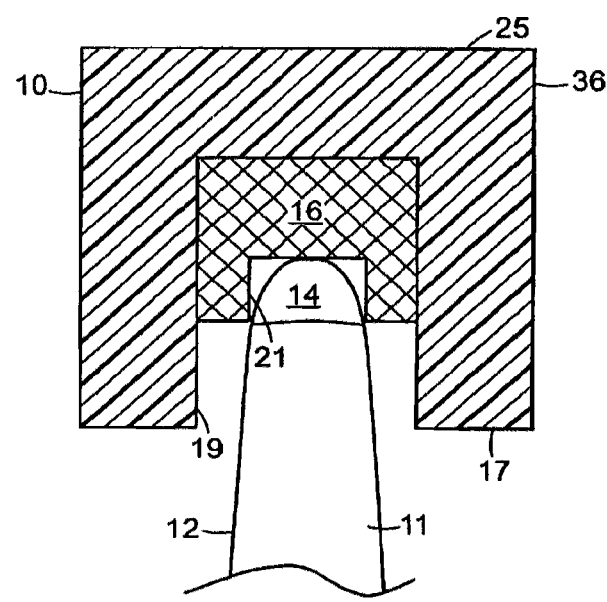
FIG. 9 is a section view of an alternative embodiment showing the toothbrush of FIG. 1 magnetically secured to a holder.

As shown in FIG. 1, holder 10 has a recess 18 formed in its lower and front surfaces, which defines a bottom surface 17 in which at least one recess 19 is formed. In certain embodiments, as seen in FIG. 1, a plurality of recesses 19 is formed in bottom surface 17, with each recess 19 receiving a second magnetic element 16. In other embodiments, it is to be appreciated that a plurality of second magnetic elements 16 may be seated in a single recess 19. The proximal ends of toothbrushes 12 are suspended within recesses 19 by the magnetic attraction of first magnetic element 14 to second magnetic element 16, as seen in FIG. 8. In certain embodiments, as seen in FIG. 9, second magnetic element 16 may have a central aperture 21 formed in its lower surface, within which the proximal end of handle 11 with first magnetic element 14 is received.

It is to be appreciated that second magnetic element 16 can have any desired shape. As illustrated in FIGS. 1, and 8, second magnetic element 16 is a rectilinear block. In other embodiments, as illustrated in FIG. 9, second magnetic element 16 may be substantially cylindrical. Other suitable shapes for second magnetic element 16 will become readily apparent to those skilled in the art, given the benefit of this disclosure.

In certain embodiments, holder 10 may also include indicia 20a-c. Indicia 20a-c may be used, for example, to indicate the owner of a particular toothbrush. Thus, as seen in the example illustrated in FIG. 1, 20a is "MOM", 20B is "DAD" and 20c is "KIDS". Any desired indicia can be used to designate the owner or user of a particular toothbrush.

As seen here, holder 10 is a substantially rectangular block secured to a wall 22 with adhesive, suction members or any other suitable fastening means. Holder 10 has a size, that is, a length and depth, sufficient to support a tube of toothpaste 24 on its upper, or top, surface 25, which is substantially planar and extends substantially horizontally when holder 10 is in an installed or in-use condition.

Figure 2:
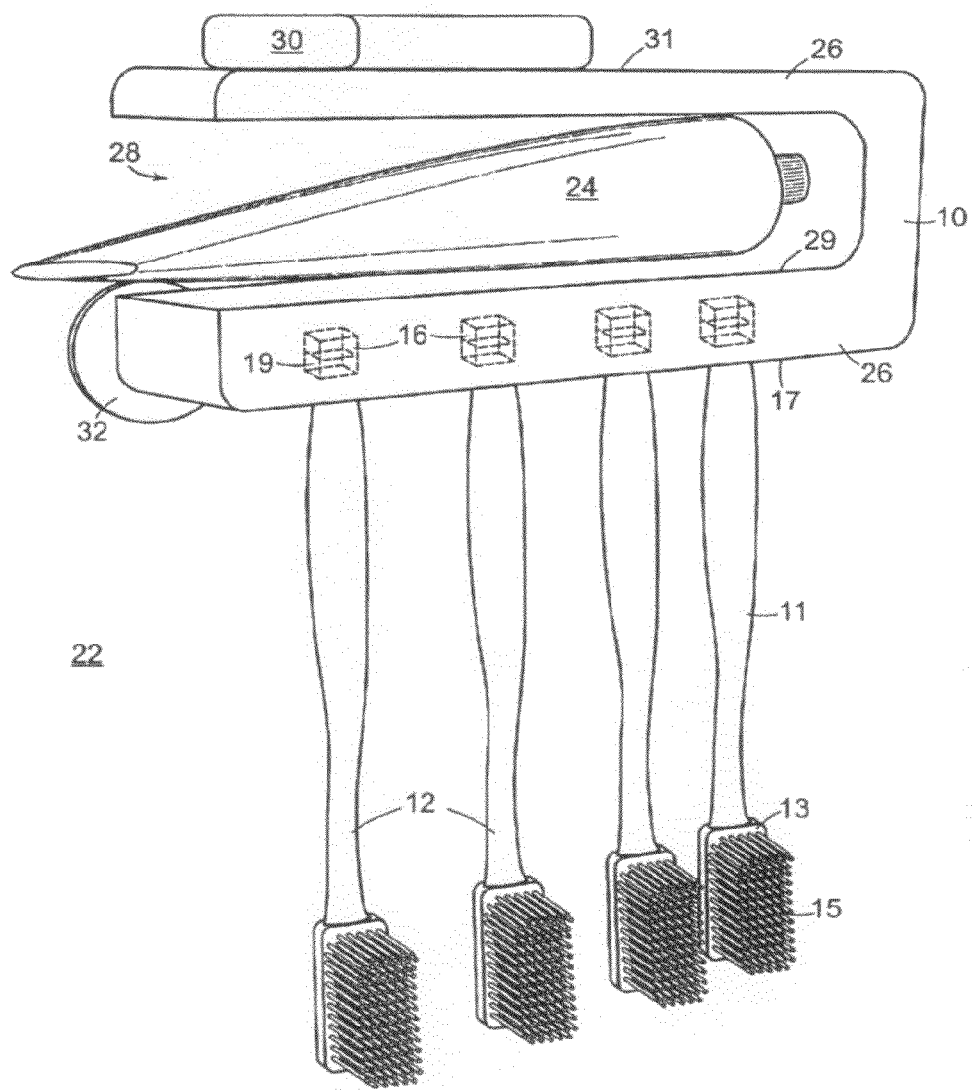
FIG. 2 is a perspective view of an alternative embodiment of a toothbrush and holder.

Another embodiment of holder 10 is seen in FIG. 2, in which holder 10 has a substantially C-shaped profile having a pair of arms 26. Holder 10 is secured to wall 22 or other surface, such that arms 26 extend substantially horizontally and define a recess 28 therein. Second magnetic elements 16 are positioned in recesses 19 formed in the bottom surface 17 of the lower arm 26 such that toothbrushes 12 hang down from holder 10. A tube of toothpaste 24 can be seated within recess 28 on an upper surface 29 of lower arm 26, and soap 30 may be seated on an upper surface 31 of upper arm 26 of holder 10. Alternatively, toothpaste tube 24 can be seated on upper surface 31 of upper arm 26 and soap 30 can be seated on upper surface 29 of lower arm 26. Holder 10 may be secured to wall 22 with suction members 32, adhesive or any other suitable fastening means.

Figure 3:
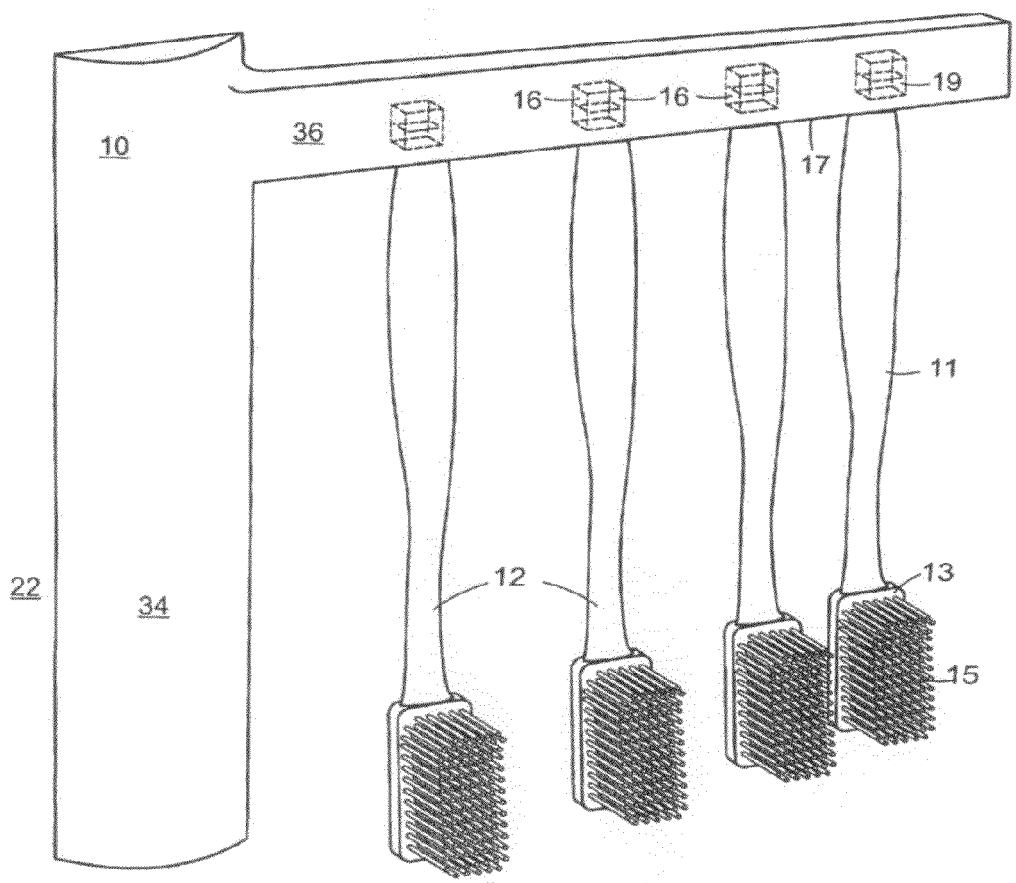
FIG. 3 is a perspective view of another alternative embodiment of a toothbrush and holder.

Another embodiment is shown in FIG. 3 in which holder 10 includes a base member 34 secured to wall 22. An arm 36 extends from base member 34. Second magnetic elements 16 are positioned in recesses 19 formed in the bottom surface 17 of arm 36 such that toothbrushes 12 hang down from holder 10. In the illustrated embodiment, base member 34 is a substantially hemispherical member extending substantially vertically along wall 22, and arm 36 is a substantially rectangular block that extends substantially horizontally along wall 22 from base member 34.

In light of the foregoing disclosure of the invention and description of various embodiments, those skilled in this area of technology will readily understand that various modifications and adaptations can be made without departing from the scope and spirit of the invention.

What is claimed is:

1. A toothbrush and holder assembly comprising:
   a toothbrush having a handle, a head connected to the handle, cleaning elements extending outwardly from the head, and a first magnetic element integrated into a portion of the handle; and
   a holder having a bottom surface, at least one recess formed in the bottom surface, and at least one second magnetic element seated in the at least one recess, each recess being configured to receive the portion of the handle; and
   wherein the second magnetic element comprises a central aperture, and wherein the portion of the handle is received within the central aperture.

2. The toothbrush and holder assembly of claim 1, wherein the holder includes a plurality of recesses formed in the bottom surface, each recess receiving a second magnetic element.

3. The toothbrush and holder assembly of claim 1, wherein the holder includes a plurality of second magnetic elements, and further comprising at least one additional toothbrush, each additional toothbrush having a first magnetic element integrated into a portion thereof.

4. The toothbrush and holder assembly of claim 1, wherein at least one of the first magnetic element and the second magnetic element is a magnet.

5. The toothbrush and holder assembly of claim 1, wherein one of the first magnetic element and the second magnetic element is formed of metal.

6. The toothbrush and holder assembly of claim 1, wherein an upper surface of the holder is a substantially planar horizontally extending surface of a size sufficient to support a tube of toothpaste.

7. The toothbrush and holder assembly of claim 1, further comprising at least one suction cup for securing the holder to a surface.

8. The toothbrush and holder assembly of claim 1, further comprising indicia on the holder.

9. The toothbrush and holder assembly of claim 8, wherein the indicia is provided adjacent each recess.

10. The toothbrush and holder assembly of claim 1, wherein the first magnetic element forms a proximal end of the handle.

11. A toothbrush and holder assembly comprising:
    a toothbrush having a handle, a head connected to the handle, cleaning elements extending outwardly from the head, and a first magnetic element integrated into a portion of the handle; and
    a holder having a bottom surface, at least one recess formed in the bottom surface, and at least one second magnetic element seated in the at least one recess, each recess being configured to receive the portion of the handle;

wherein the holder includes a pair of horizontally extending arms that are spaced apart by a gap, the at least one recess being formed in a bottom surface of a lower arm of the pair of arms; and wherein a tube of toothpaste is positioned within the gap and supported by a top surface of the lower arm.

\* \* \* \* \*